W. O. WORTH.
FOUR-WHEEL DRIVE AND TRANSMISSION THEREFOR.
APPLICATION FILED APR. 29, 1908.
1,068,957.
Patented July 29, 1913.
7 SHEETS—SHEET 1.
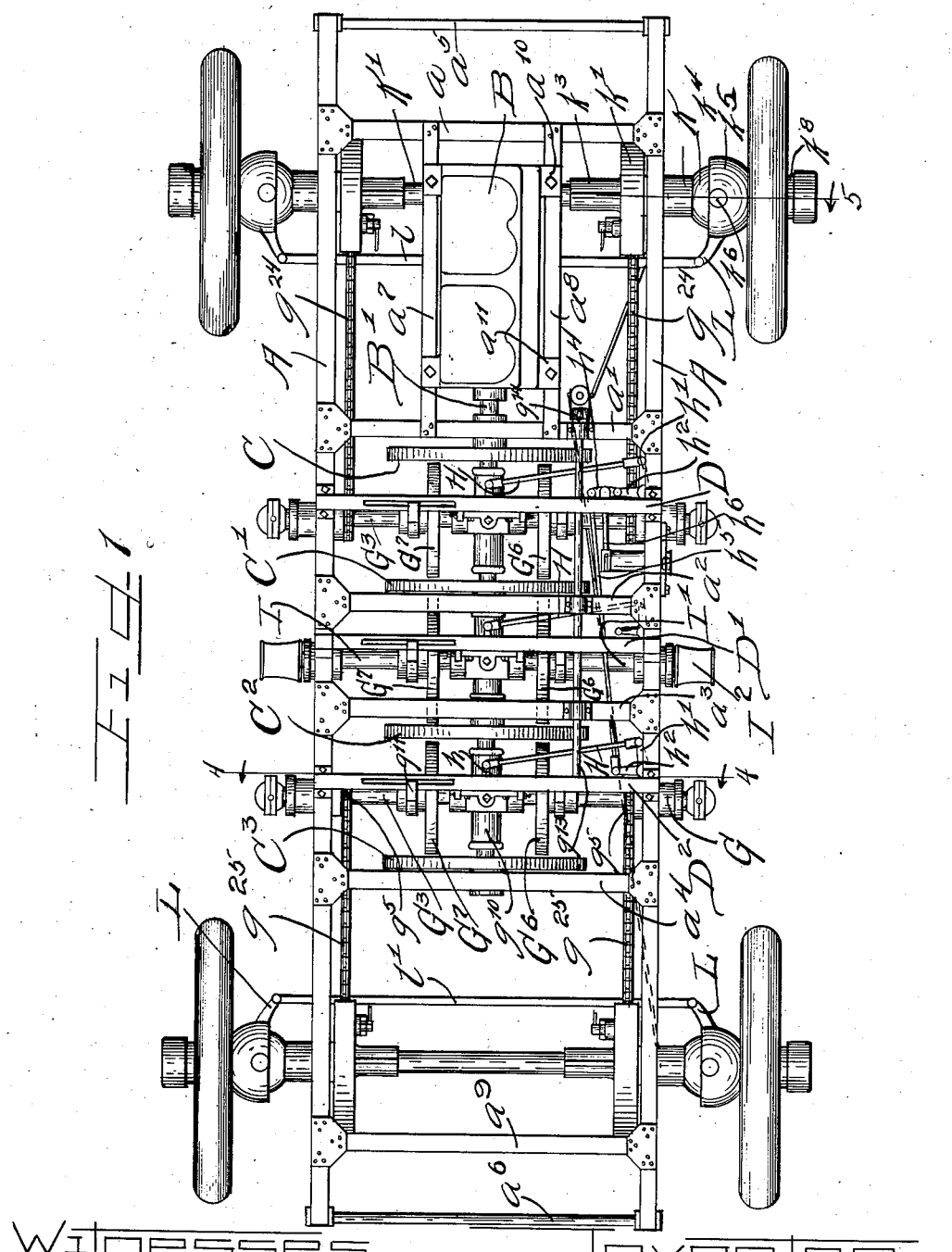

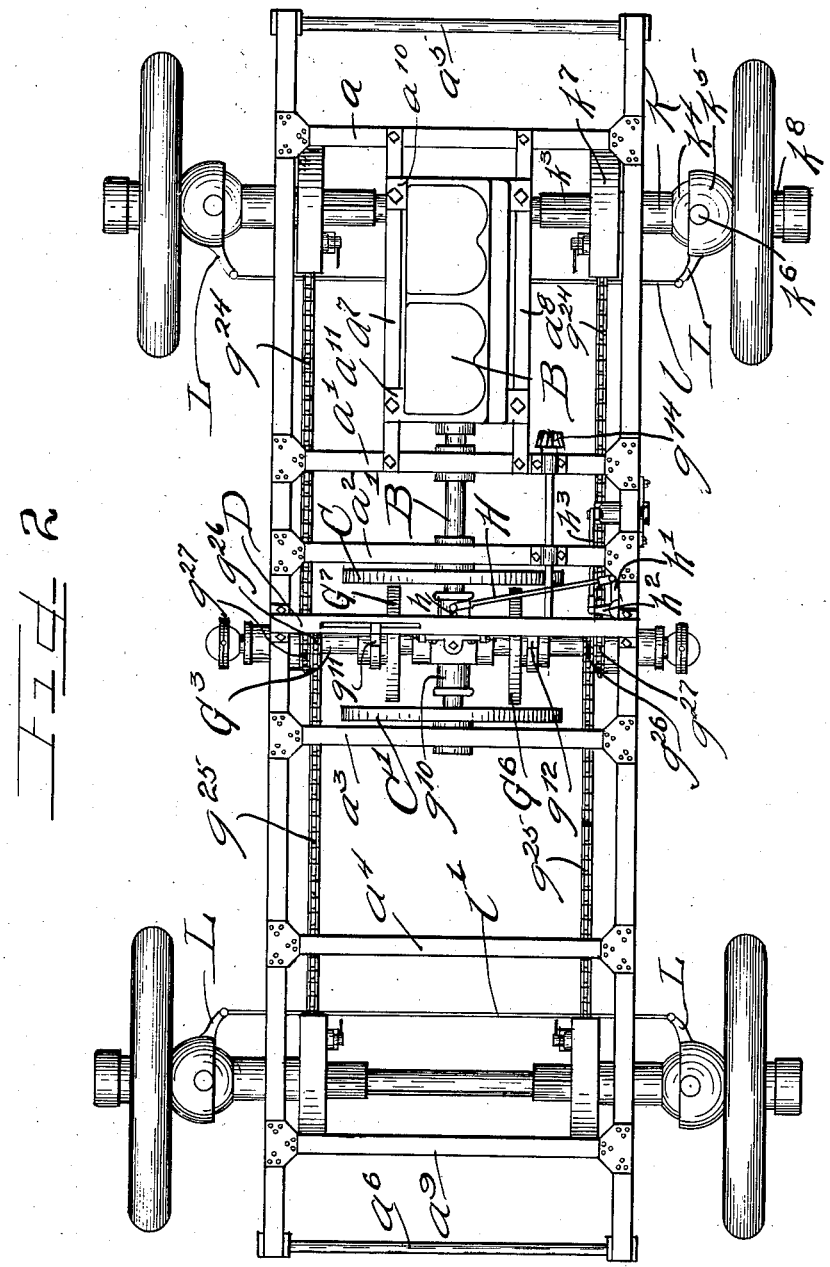

W. O. WORTH.
FOUR-WHEEL DRIVE AND TRANSMISSION THEREFOR.
APPLICATION FILED APR. 29, 1908.
1,068,957.
Patented July 29, 1913.
7 SHEETS—SHEET 3.
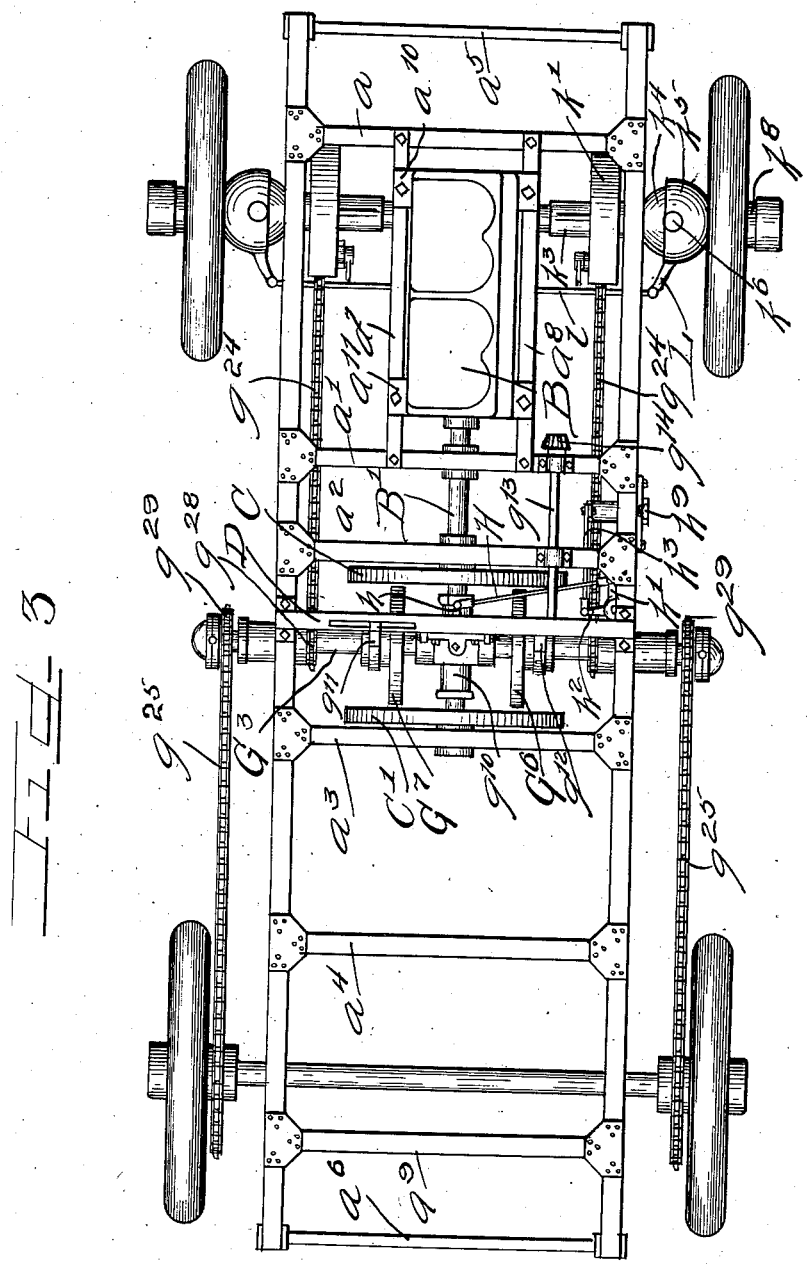

W. O. WORTH.
FOUR-WHEEL DRIVE AND TRANSMISSION THEREFOR.
APPLICATION FILED APR. 29, 1908.
1,068,957.
Patented July 29, 1913.
7 SHEETS—SHEET 4.
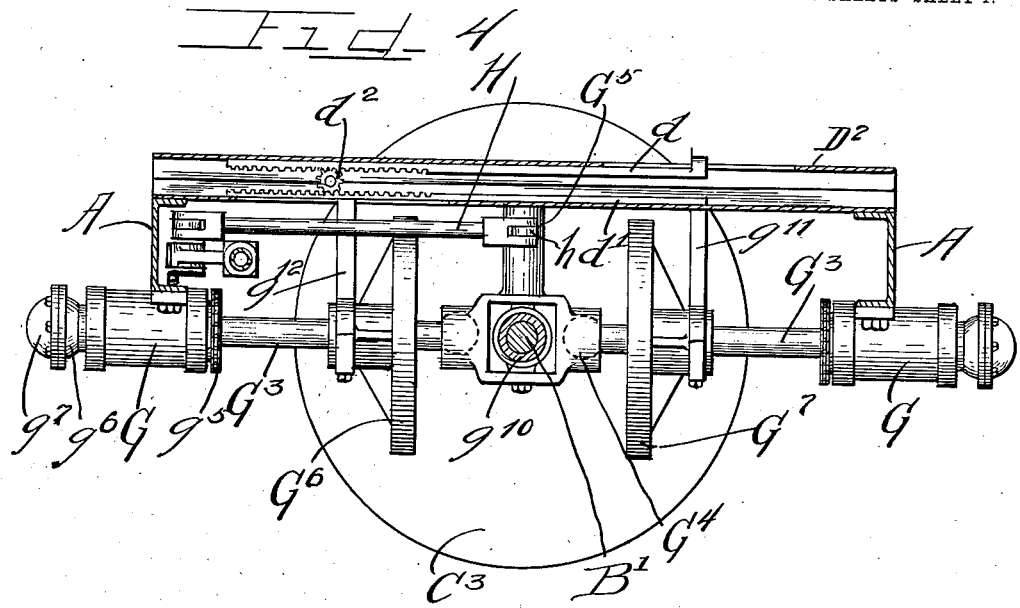
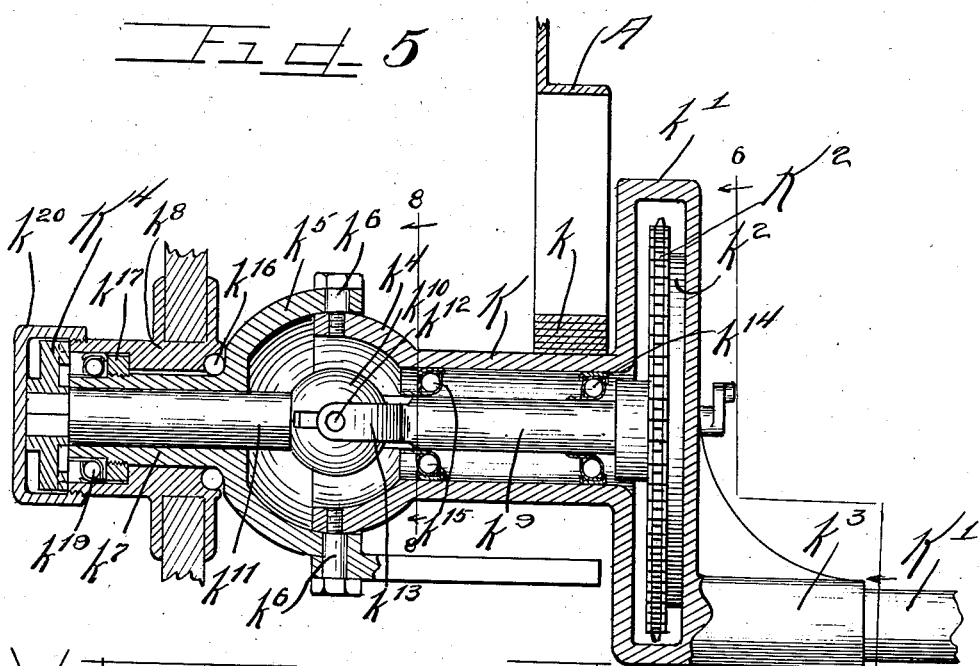

W. O. WORTH.
FOUR-WHEEL DRIVE AND TRANSMISSION THEREFOR.
APPLICATION FILED APR. 29, 1908.
1,068,957.
Patented July 29, 1913.
7 SHEETS—SHEET 5.
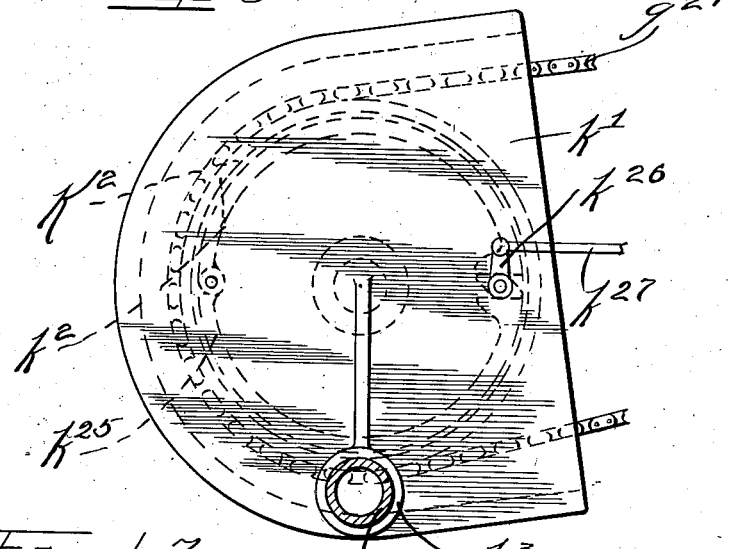
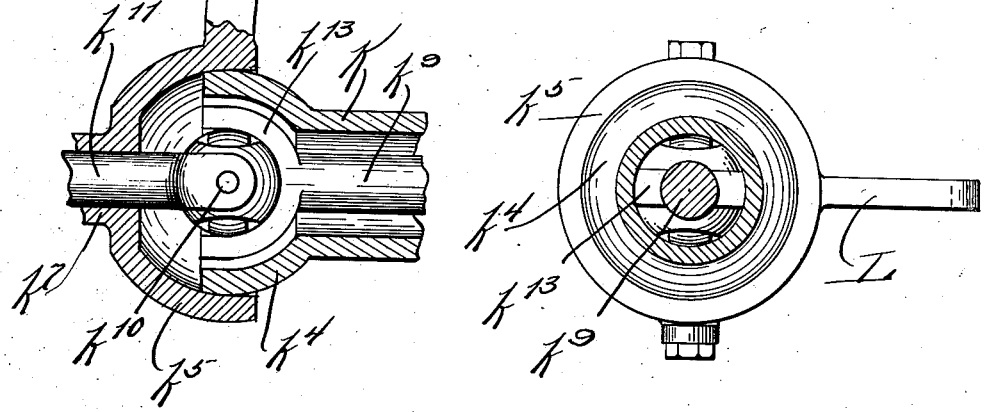

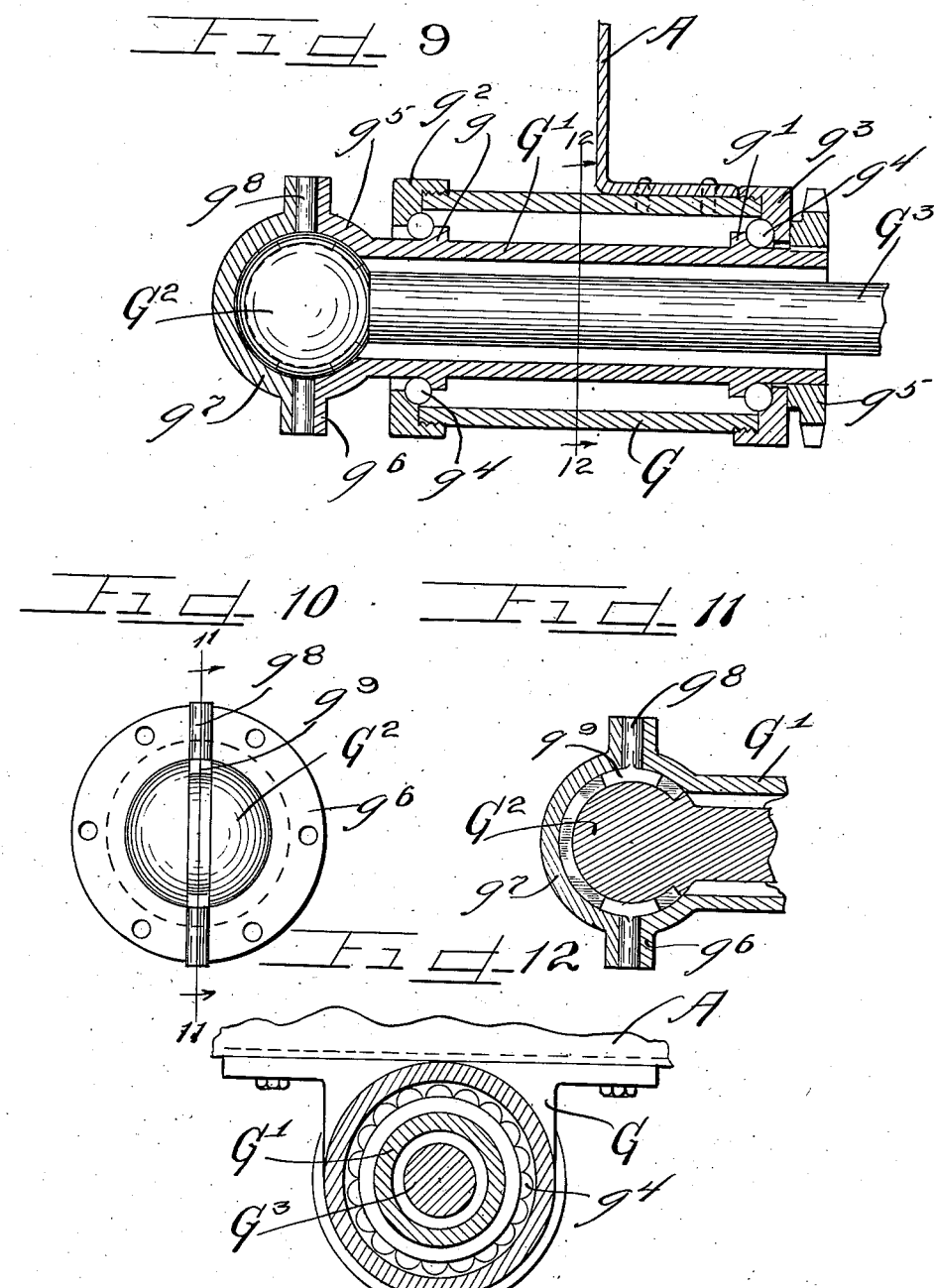

W. O. WORTH.
FOUR-WHEEL DRIVE AND TRANSMISSION THEREFOR.
APPLICATION FILED APR. 29, 1908.
1,068,957.
Patented July 29, 1913.
7 SHEETS—SHEET 7.
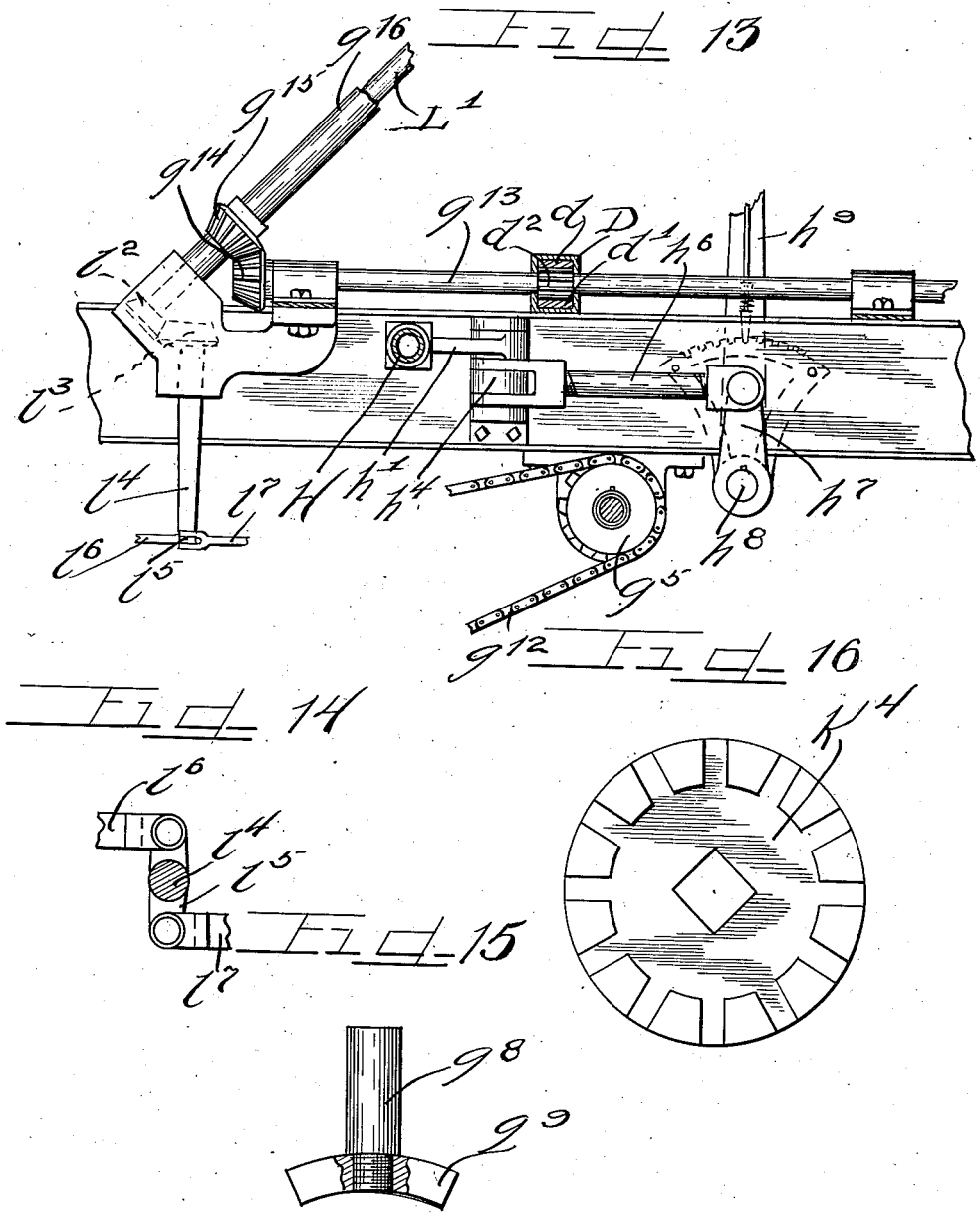

UNITED STATES PATENT OFFICE.

WILLIAM O. WORTH, OF KANKAKEE, ILLINOIS.

FOUR-WHEEL DRIVE AND TRANSMISSION THEREFOR.

1,068,957.　　　　　Specification of Letters Patent.　　Patented July 29, 1913.

Application filed April 29, 1908. Serial No. 430,000.

*To all whom it may concern:*

Be it known that I, WILLIAM O. WORTH, a citizen of the United States, and a resident of the city of Kankakee, Kankakee county, Illinois, have invented certain new and useful Improvements in Four-Wheel Drive and Transmission Therefor; and I do hereby declare that the following is a full, clear, and exact description of the same, reference being had to the accompanying drawings, and the letters of reference marked thereon, which form a part of this specification.

As automobiles have been heretofore constructed, (except in a very few instances, most of which are operated with electric motive power,) the car is driven by the rear wheels only. In other words, the car with its load is pushed ahead by the rear wheels, in consequence where the road is slippery or "greasy" skidding is likely to occur with consequent likelihood of damage. Furthermore, with the rear wheel drive, inasmuch as the front wheels are merely pushed along, the drive becomes exceedingly difficult when the road is rough or soft, and it has been frequently found in practice, in a piece of bad road that though the car cannot proceed ahead, it may be readily backed out of a bad piece of road inasmuch as in reversing, cars with such drive are pulled by the rear wheels instead of pushed by the rear wheels. Furthermore in maneuvering a car for position, it is found, in fact, usually is true that if the power is applied to the front and rear wheels the steering may also be effected by turning both the front and rear wheels and the car may be more quickly turned about or placed in any desired position than in the case where one set of wheels only is turned in steering.

The object of this invention is to afford an automobile construction suitable either for pleasure cars or for trucks, but particularly suitable for the latter in which the power is applied with equal efficiency to both the rear and the front wheels both in reversing or in driving ahead, thereby enabling double the tractive effort to be secured with practically the same power.

It is also an object of the invention to afford in connection with such a car transmission devices whereby the power may be applied either to the front wheels or the rear wheels only, or to both the front and the rear wheels, as the operator prefers, and the exigencies of the service require.

It is also an object of the invention to afford a construction in which the steering of the car may be accomplished by either the front wheels or the rear wheels or by both the front wheels and the rear wheels as the operator may find best suited in positioning the car.

It is a further object of the invention to afford a construction in which an exceedingly powerful transmission mechanism is installed, said transmission mechanism being adaptable for propelling the car and also to afford in connection with said transmission device a powerful winch, or winches, operated thereby and adapted for use at any time, either to assist in propelling the car on particularly bad roads, or as more frequently is desirable, to assist in loading and unloading the car or truck with heavy articles, in which instance the power of the engine is utilized by means of the transmission mechanism ordinarily used in propelling the car.

The invention embraces many novel features and consists in the matters hereinafter described and more fully pointed out and defined in the appended claims.

In the drawings: Figure 1 is a top plan view of the chassis of an automobile truck embodying my invention and provided with a double transmission mechanism acting independently for the front and rear wheels respectively, and conjointly acting to drive the winch. Fig. 2 is a similar view showing the four wheel drive effected with a single transmission mechanism. Fig. 3 is a similar view showing a construction in which the front wheels only are turned in steering. Fig. 4 is an enlarged transverse section on lines 4—4 of Fig. 1, with the driven friction disks in elevation. Fig. 5 is an enlarged transverse section taken on line 5 of Fig. 1, and showing the universal joint in each of the axle stubs and also illustrating the method of driving the axle. Fig. 6 is a fragmentary section on line 6—6 of Fig. 5. Fig. 7 is an enlarged fragmentary section taken through the universal joint in one of the axles and at right angles with that shown in Fig. 5. Fig. 8 is a section taken on line 8—8 of Fig. 5. Fig. 9 is an enlarged longitudinal section of one of the transverse driven transmission shafts and the bearings therefor. Fig. 10 is a view in elevation with the outer cap for the universal bearing shown in Fig. 9 removed. Fig. 11 is a section taken on line 11—11 of Fig. 10. Fig. 12 is a section taken on line 12—12 of Fig. 9. Fig. 13 is an enlarged detail of the steering and the shifting mechanism for the transmission mechanism. Fig. 14 is a fragmentary detail of a part of the shifting mechanism. Fig. 15 is an enlarged detail of one of the dowel pins affording part of one of the universal joints. Fig. 16 is an enlarged inner face view of the adjusting end washer and clutch whereby the automobile wheels are respectively engaged upon the shaft or axle and driven therefrom.

As shown in the drawings, referring first to Fig. 1, A indicates the side sill or frame members of an automobile, which, for the purposes of the present specification, may be described as an automobile truck, though obviously, the construction is adaptable for pleasure as well as commercial purposes. Connecting said side sill members A, in substantially parallel relation are transverse sills $a$ to $a^4$ inclusive and $a^9$ and at the extremities the rods $a^5$—$a^6$. Supported upon structural bars of any suitable form $a^7$—$a^8$, extending parallel with the side sills and bolted or otherwise secured to the cross sills $a$—$a'$, are the motor supporting sills $a^{10}$—$a^{11}$ on which is supported the motor B, in the present instance, as shown, as an internal combustion or explosion motor such as a gasolene engine, though, of course, a motor of different type may be used, if preferred. Extending longitudinally of the frame is the motor shaft B', on which, as shown, are rigidly secured one or more pairs of oppositely facing driven friction disks C—C' $C^2$—$C^3$, as shown in Fig. 1. Said friction disks C'—$C^2$ are, as shown, approximately the same distance apart from the adjacent friction disks C and $C^3$ on the opposite sides thereof and afford, as shown, between each pair of friction disks friction faces, whereby the driven friction disks may be actuated to propel the car. Rigidly bolted on the side sill members A, which are conveniently shown as channel bars, are transverse beams D—D'—$D^2$, one between each pair of driving friction disks on the main engine shaft, and as shown, each consisting of two inwardly facing channel bars between the webs and flanges of which are slidably secured rack bars $d$ $d'$, each facing the other and each meshing with a pinion $d^2$, whereby the racks may be shifted oppositely. Rigidly bolted or otherwise secured on the under side of the side sills A, below said beam are short cylindric bearings or housings G, through which from the outer side extends a sleeve G', of cast steel or other suitable metal, provided with outwardly facing ribs $g$—$g'$, each forming one portion of a ball race, the other portion of which is afforded by the adjusting nuts $g^2$—$g^3$, threaded on the ends of the sleeve G, and between which are engaged balls $g^4$, affording an anti-friction bearing. Keyed on the inner end of the sleeve G', is a sprocket wheel $g^5$, which is rotated by said shell or sleeve G'. The outer end of the sleeve G', is enlarged and is spherically concave on its end to afford one half of the ball shaped socket for a universal bearing or ball and socket joint, and as shown, at its outer extremity and corresponding approximately with the plane of the diameter of the ball member in said joint, is a flange $g^6$, having apertures therethrough, which register in corresponding apertures in the complemental cap member $g^7$, which completes the socket at the outer end of the sleeve. Fitting in said socket is the ball shaped end or head $G^2$, of the driven shaft $G^3$, which is of much smaller diameter than the bore of the sleeve G'. Said ball end on said shaft is held from rotation in the socket of the sleeve by means of a pin $g^8$, which extends one on each side of the ball into a suitable recess provided in the flanges $g^6$, on said sleeve and cap and at the inner end of the pins is provided an enlarged segmental plate $g^9$, adapted to fit in a complemental groove or seat in the ball and which extends, as shown, in Figs. 10 and 11, part way around the same longitudinally thereof to permit the inner end of said shaft $G^3$, to be adjusted relatively the inner end of the sleeve, though of necessity compelling said sleeve to rotate with the shaft.

Supported on the driving shaft and adjustably secured thereon are bearing members $G^4$, in the oppositely directed ends of which the shafts $G^3$ are journaled and whereby by the adjustment of said bearing member the inner end of one of said shafts may be elevated and the other depressed, or the inner end of one of said shafts swung forward and the other rearwardly and for this purpose, as shown, a sleeve or collar is secured on the driving shaft B', as indicated by $g^{10}$, to centralize said bearing, though permitting the same to rock on the shaft B'. Supporting said bearing member $G^4$, is a standard or column $G^5$, which is rigidly secured to its respective beam. Feathered on each of said shafts $G^3$, is a driven friction disk $G^6$—$G^7$, either of which is adapted to engage the forward driving friction disk when the other thereof is engaged upon the corresponding rear driving disk. As shown also, engaged on the hub of each of said driven friction disks is an upwardly extending strap or bracket $g^{11}$, and $g^{12}$, the former of which extends forwardly over the beam before described and in a slot in the top thereof and is rigidly connected with the upper rack bar and the latter of which extends upwardly through a slot in the bottom of the beam and engages the lower rack bar $d'$, so that actuation of the gear of necessity shifts the driven friction disks correspondingly inwardly or outwardly with reference to the driving friction disks. Means are provided for actuating said pinion comprising, as shown in Fig. 13, a shaft $g^{13}$, which extends through said beams D to $D^2$, inclusive, and on which said pinions $d^2$ are rigidly keyed. Said shaft is provided at its forward end with a bevel pinion $g^{14}$, adapted to mesh with the bevel pinion $g^{15}$, on a sleeve $g^{16}$, concentric with the steering post, and adapted to be operated by a hand wheel, which may be positioned below the steering hand wheel in any familiar manner. In this manner the driven friction disks both for the front and the rear transmissions and the double construction shown in Fig. 1, are adjusted simultaneously and to an equal extent. Means are also shown for adjusting one of the driven friction disks forwardly into engagement with the front driving disk and the other rearwardly into engagement with the rear driving disk. For this purpose, as shown, an arm $h$, is provided upon the column $G^5$, on the swinging bearing member $G^4$, and as shown, is directed longitudinally of the car or frame and pivotally engaged on the extremity thereof, is a rod or bar H, which extends transversely and the outer end thereof engages one end of a bell crank lever $h'$, the other end of which $h^2$, is pivotally engaged by a rod $h^3$ as shown in Figs. 2 and 3. In the construction shown in Fig. 1, said arm $h^2$, of the bell crank lever, is connected with one end of a lever $h^4$, the other end of which is connected with a rod $h^5$, which extends to a corresponding arm $h^2$, on the bell crank for shifting the rear driven friction disks.

A rod $h^6$, is pivotally connected at one end to the lever $h^4$, and at its opposite end is pivotally connected with a crank arm $h^7$, rigidly secured on a shaft $h^8$, and a lever $h^9$ also secured on said shaft $h^8$ is adapted for manual actuation to adjust the front and rear rods $h^3$ simultaneously, thereby adjusting the respective friction members. Actuation of the rod $h^6$, in consequence, serves to shift both the front and rear bell cranks to afford a corresponding adjustment or swing of the bearing member for said driven transmission shafts, thereby throwing one of the driven disks forwardly and the other rearwardly with the corresponding driving disk and adjusting both transmission mechanisms simultaneously to drive in the same direction. In the same manner the winch shafts I—I', each provided with a suitable barrel $I^2$, at its end to receive a line therearound, may be actuated to shift either or both driven winch friction disks into engagement with either or both of the adjacent driving friction disks and if preferred, a suitable crane may be provided at a convenient point on the car and the hoisting line therefor may be operated from the winch on either side the car, or if desired, one winch may be used in loading and the other used in unloading simultaneously.

To secure the four wheel drive before mentioned, the front and rear axles supporting the chassis are constructed substantially the same. In each instance, a cast steel sleeve K, of suitable length to receive thereon the spring $k$, for supporting the chassis frame A, is provided at its inner end with an integral housing $k'$, adapted to contain a sprocket wheel $K^2$, and a friction wheel $k^2$, for the band brake $k^{25}$. Said housing at its lower side is provided with a transversely directed sleeve $k^3$, in which is rigidly engaged the end of the axle K', the other end of which is engaged in the complemental sleeve for the wheel on the opposite side of the frame. Said sleeve K, at its outer end flares outwardly to afford a cup shaped head $k^4$, which fits into a complemental concave head or cup $k^5$, and is pivotally engaged thereto by means of set or cap screws $k^6$, or other suitable pivotal connections, as shown in Fig. 5. Extending outwardly from the concave head $k^5$, is the sleeve stub $k^7$, on which the automobile wheel $k^8$, is journaled as hereinafter described.

Rigidly secured in the hub of the band wheel and sprocket wheel $K^2$, is the stub axle $k^9$, which is engaged with the head $k^{10}$, of the stub shaft $k^{11}$, by means of a yoke $k^{13}$, affording a universal or gimbal joint. As shown, the axle stub $k^9$, is journaled in the sleeve K, by means of ball bearings, the cups and cones and balls of which are, as shown, somewhat diagrammatical in Fig. 5, and indicated by $k^{14}$—$k^{15}$, and as shown, the automobile wheel $k^8$, is journaled on the stub sleeve $k^7$, by means of a ball bearing, the inner balls $k^{16}$, lying in a race formed between the heads $k^5$, of the stub sleeve and the inner end of the hub, the one serving as the cup and the other for the cone. Threaded on the stub sleeve is an adjusting nut $k^{17}$, whereby the hub of the wheel may be set inwardly to adjust the balls $k^{16}$ in their races, and, as shown, a corresponding ball bearing $k^{19}$ is provided between the stub sleeve and the outer end of the hub. Said outer end of the hub is shaped to afford in effect one member of a clutch and engaged on the angular end of the stub shaft $k^{11}$, is a clutch washer $K^4$, which engages the end of the wheel hub to rotate the same with the axle stub shaft, and threaded on the end of the hub is a hub cap $k^{20}$, whereby said clutch washer may be held in inward adjustment to assure the driving of the wheel by rotation of the shaft. All of the four wheels of the automobile herein described, as shown in Figs. 1 and 2, and the front wheels of the construction shown in Fig. 3, are journaled as herein described, and as shown in Fig. 1 the sprocket wheels $g^5$, on the ends of the shafts $G^3$ are in alinement with the sprocket wheels $K^2$, in the housing $k'$, so that the front transmission shown in Fig. 1, drives the front wheels by means of sprocket chains $g^{24}$, and the rear transmission mechanism drives the rear wheels in a corresponding manner by means of sprocket chains $g^{25}$.

In the construction shown in Fig. 2, in which the transmission mechanism is constructed singly, each transmission shaft $G^3$, is provided with two sprocket wheels $g^{26}$—$g^{27}$ side by side, on one of which the sprocket chains $g^{24}$ driving to the front wheels is trained and on the other the sprocket chain $g^{25}$ driving to the rear wheels, the effect being the same as before described.

In the construction shown in Fig. 3, in which a single transmission mechanism is shown, the steering is effected only by the front wheels, and the drive is from a sprocket wheel $g^{28}$ on the shaft $G^3$, by means of a chain $g^{24}$, as before described, and as shown, a suitable sprocket wheel $g^{29}$ is provided at the outer end of each of said shafts substantially at the ball and socket joint therefor, and trained about the same and about suitable sprocket wheels on the hubs of the rear wheels is a sprocket chain $g^{25}$, as shown in Fig. 3, in which instance the four wheel drive is effectively secured. As shown, each of the cup shaped heads of the stub sleeves is provided with a steering knuckle or arm L, those of the front wheels being connected by means of a rod $l$, and those of the rear wheels being connected in a similar manner by a rod $l'$ and any suitable connection is provided between the steering post L' and said arms L, or rods $l$—$l'$, whereby both the front wheels and rear wheels may be adjusted, the one to steer in one direction or both independently and simultaneously, as desired.

A convenient method of connecting the front and rear wheels to operate simultaneously is to secure a bevel pinion $l^2$ on the end of the steering shaft L', which meshes with a beveled pinion $l^3$ on the inner end of a shaft $l^4$, to the lower end of which is rigidly secured a lever $l^5$. Rods $l^6$—$l^7$ are pivotally secured at their inner ends to opposite ends of the lever $l^5$, and extend to opposite ends of the machine and are connected appropriately with the rods $l$—$l'$. Of course, there are many ways in which this adjustment in steering may be secured. A convenient way is to simply duplicate the usual and familiar present method of adjusting the front wheels in steering and affording a secure connection for the rear wheels and providing an independent steering wheel for each set of wheels.

The operation is as follows: In propelling the car provided with a double transmission mechanism, either transmission mechanism may be used independently of the other. The transmission mechanism not only affords powerful means of transmitting power to the wheels in propelling the car, but effectively operates as a power brake to stop the car. When moving the car in either direction, it is only necessary to actuate the friction lever to throw the driven friction members into driving engagement with the friction member complemental with that previously engaged. In this manner the power of the engine may be used as a brake to stop the car, though, of course, each of the wheels being provided with a band brake $k^{25}$, crank $k^{26}$ and actuating rod $k^{27}$, the car may be stopped by means of the foot lever or emergency brake, or hand brake, if preferred. Where the winch is used, it is quite obvious that the winch may be used while the car is in motion, inasmuch as the transmission therefor operates independently of the propelling transmission for either set of wheels, or when the car is loading or unloading and is stationary, the driving or propelling frictions being out of engagement, the hoisting frictions may be brought into engagement with the driving transmission disks and the engine employed for handling the load. The ball and socket joints provided for the transmission shafts and between the axle stubs and stub axles afford great amplitude of movement and adjustment of the wheels, permitting both wheels of either set to be turned or adjusted as the operator may desire for the most effective placing of his car, and this without in any way affecting the drive, inasmuch as the sleeve and stub axle are not varied from their normal alinement in whatsoever manner the wheels may be turned in steering.

I have provided an exceedingly simple and strong construction, which is capable of being constructed of approximately any capacity and weight, and which makes possible very numerous variations depending upon the service to which the car is to be applied. I therefore, having shown but one of numerous forms of construction to embody my invention, do not purpose limiting this application for patent otherwise than necessitated by the prior art.

I claim as my invention:

1. In a motor vehicle, a frame, front and rear wheels supporting the same, an engine supported on said frame, a shaft driven thereby, a plurality of friction disks on said shaft, a plurality of transverse shafts pivotally supported at each end, a friction wheel feathered on each of the same adapted to engage said disks, and driving connections between each of said front and rear wheels and a corresponding number of the transverse shafts.

2. In a motor vehicle a frame, front and rear wheels supporting the same, an engine supported on the frame, a longitudinal shaft driven thereby, a plurality of friction disks secured thereon, a plurality of pairs of transverse shafts pivotally supported at each end, friction wheels thereon adapted to engage said friction disks, means adapting each pair of said shafts to be oppositely rotated about one end simultaneously, and driving connections between each of said front and rear wheels and one of a part of the said pairs of shafts.

3. In a motor vehicle a frame, front and rear wheels supporting the same, an engine supported on the frame, a longitudinal shaft driven thereby, a plurality of friction disks secured thereon, winch shafts and wheel drive shafts mounted transversely of the vehicle and means thereon adapted to engage said disks and drive all said transverse shafts simultaneously.

4. In a motor vehicle a frame, wheels supporting the same, an engine supported on the frame, a longitudinal shaft driven thereby, a plurality of pairs of transversely driven shafts, the ends of each thereof pivotally mounted, coacting friction disks on the drive and driven shafts, means adapted to cause rotational displacement in opposite directions of one shaft in a pair relative the other affording contact of the said friction disks, and mechanism driving each wheel of the vehicle independently from one of the driven shafts.

5. In a motor vehicle a frame, front and rear wheels supporting the same, an engine supported on the frame, a drive shaft actuated by said engine, pairs of transmission shafts pivotally mounted on the frame, a rotatable bearing engaging the adjacent ends of each pair of shafts, friction disks on said drive shaft, friction wheels on said transmission shafts adapted to be contacted with said disks, when said bearing is rotated, and means connecting each pair of supporting wheels with a pair of the said transmission shafts to be driven thereby.

6. A motor vehicle, transmission and winch shafts mounted thereon, a motor, friction disks driven thereby and adapted to interchangeably drive said transmission and winch shafts.

7. A motor vehicle, a frame, combined steering and driving wheels supporting the same, an engine supported on said frame, a drive shaft actuated thereby, a plurality of transmission shafts, each end thereof pivotally mounted, a sleeve operated by each of said transmission shafts, sprocket wheels on said sleeves, and chains connecting the same, adapting each of the said wheels to be driven by a different shaft.

8. In a motor vehicle a frame, a pair of front and a pair of rear wheels supporting the frame, an engine supported on the frame, a shaft driven thereby, transmission shafts, sleeves operated thereby, sprocket wheels secured to the sleeves, a sprocket wheel connected with each wheel of the vehicle, chains connecting the respective sprocket wheels for the vehicle wheels with the sprocket wheels on the sleeves, each of the same on a different shaft.

9. In a motor vehicle a frame, a pair of front and a pair of rear wheels supporting the frame, a motor supported on the frame, a shaft driven thereby, a plurality of transverse transmission shafts, friction elements for operating the transmission shafts from the driven shaft and a chain transmission between one of each of the wheels of the vehicle and one of the said transmission shafts.

10. In a motor vehicle a frame, a pair of front and a pair of rear wheels supporting the frame, a motor supported on said frame, a shaft driven thereby, a plurality of parallel disks mounted thereon, a plurality of transverse shafts mounted intermediate said disks, friction wheels thereon, means for rotating said shafts about one end adapting said friction wheels to contact said disks, and driving connections with each wheel of the vehicle and one of the said transmission shafts.

11. In a motor vehicle a frame, a pair of front and rear driving wheels supporting the same and adapted to be turned for steering, an engine, a shaft driven thereby, oppositely arranged transmission elements thereon, a winch, and transmission elements for each pair of wheels and for said winch adapted to coact with the same elements on said shaft to drive both pairs of wheels and the winch simultaneously.

12. In a motor vehicle a frame, front and rear wheels supporting the same, a motor supported on the frame, a main shaft directly connected thereto, transverse shafts comprising individual wheel drives and winches, friction wheels on said shafts, friction disks on said main shaft adapted to be contacted on either face affording a simultaneous drive for said winches and wheel drive shafts.

13. In a motor vehicle the combination with the wheels and the frame supported thereon, of a motor mounted on the frame, a main shaft connected thereto, friction disks secured thereon, transverse shafts pivotally mounted transversely between said disks, friction wheels on said shafts, means for actuating said shafts adapting said friction wheels to contact opposite faces of the same or different disks affording a driving connection to said transverse shafts.

14. In a motor vehicle the combination with the front and rear wheels, the axles, the chassis frame and the motor mounted on the frame, of a shaft driven by the motor, a plurality of flat faced disks rigidly secured on said shaft, a plurality of transverse shafts adapted to be adjusted about one end thereof toward and away from said disks, friction wheels on said shafts adapted to contact said disks, winch heads on some of said shafts and driving mechanism connected to each of the four wheels and to each one of four of said shafts.

15. In a motor vehicle the frame, a motor thereon, a shaft connected thereto, a plurality of friction disks mounted thereon and adapted to be contacted on both faces, a plurality of shafts adjustably mounted between said disks, friction wheels thereon, a plurality of rotatable bearings supporting the ends of two opposite shafts adapted to move said shafts in opposite directions to afford a contact between said friction elements.

16. In a four wheel motor vehicle, a motor, friction disks driven thereby, friction wheels mounted between said disks, said friction disks adapted to be contacted on both faces and said friction wheels each adapted to contact two of said disks affording distributing means for the power from the motor.

17. In a vehicle, the combination with the front and rear wheels and the axles, of means connecting said wheels with the axles to permit the wheels to be turned from their normal planes of rotation, a frame on said axles, a motor supported on said frame, a shaft therefor, winch shafts and driving shafts, friction wheels on said winch and driving shafts, and disks on said motor shaft adapted to be contacted by said friction wheels on each of their faces to afford a drive for said winch and driving shafts.

18. In a motor vehicle of the class described a frame, a motor thereon, a shaft connected thereto, friction disks mounted thereon, a plurality of transverse toothed racks slidably mounted on the frame, a longitudinal shaft, pinions thereon engaging said racks, a plurality of pivotally mounted transverse shafts, friction wheels thereon, arms loosely connected to said wheels and said racks, adapted to move said wheels across the disk when said longitudinal shaft is rotated, and means connecting one of each of the transverse shafts with each one of the wheels of the vehicle.

19. In a motor vehicle of the class described, a motor, a shaft connected thereto, a plurality of friction disks thereon, transmission shafts and winch shafts pivotally mounted transversely of the vehicle, friction wheels thereon, and either one of a pair of said friction disks adapted to contact both the transmission and winch shaft friction wheels, affording a simultaneous drive for the respective shafts thereof.

In testimony whereof I have hereunto subscribed my name in the presence of two subscribing witnesses.

WILLIAM O. WORTH.

Witnesses:
K. E. HANNAH,
LAWRENCE REIBSTEIN.